United States Patent [19]
Bock

[11] 3,780,299
[45] Dec. 18, 1973

[54] DEVICE FOR THE PRODUCTION OF A MEASURING SIGNAL OR CONTROL

[75] Inventor: Hartmut Bock, Fischbach/Taunus, Germany

[73] Assignee: Kalle Aktiengesellschaft, Wiesbaden-Biebrich, Germany

[22] Filed: Aug. 7, 1972

[21] Appl. No.: 278,213

[30] Foreign Application Priority Data
Aug. 6, 1971 Germany .................. P 21 39 324.8

[52] U.S. Cl. ............ 250/209, 250/220 SD, 356/212
[51] Int. Cl. ......................................... G01n 21/48
[58] Field of Search ................ 250/220 C, 220 SD, 250/218, 209; 356/212

[56] References Cited
UNITED STATES PATENTS
3,233,781  2/1966  Grubbs ...................... 356/212 X Primary Examiner—James W. Lawrence
Assistant Examiner—T. N. Grigsby
Attorney—Richard K. Stevens et al.

[57] ABSTRACT

A device for the production of a measuring or control signal, which device has a radiation source and a receiver for the measuring radiation, modified by the measured point, and for the unmodified reference radiation as well as a device for converting the receiver values into the measuring or control signal, characterized in that the device has an outlet window section and an inlet window section and that the radiation source, the receiver, and the window sections are so arranged that the measuring radiation and the reference radiation emerge or enter each at the same place through the window sections but form an angle there with one another.

10 Claims, 4 Drawing Figures

DEVICE FOR THE PRODUCTION OF A MEASURING SIGNAL OR CONTROL

This invention relates to a device for the production of a measuring or control signal, which device has a signal source and a receiver for receiving a signal modified by the thing to be measured or controlled (measuring radiation) and also the unmodified measuring signal as well as a means for converting the received values into the measuring signal or control signal.

It is known to measure geometrical, physical or chemical properties at a desired point by radiation, particularly by electromagnetic radiation, e.g. light, and optionally to control at that point the change in these properties in that a measuring radiation is compared with a reference radiation. Optical densities, distances, and surface qualities may be determined by this way. In electrophotographic reproduction machines, the toner concentration may be measured by measuring the blackening of images to which toner has been applied.

Particularly in the case of the last mentioned machines, the problem is that a certain quantity of toner is always present in the air. This toner deposits itself on the optical measuring instruments and thus invalidates the measurements since a blackening is measured which partly results from the toner which is deposited on the measuring instruments themselves, and particularly the lenses, windows or optical transducers.

The object of the invention is thus to provide a device of the above kind in which a property change or contamination at the outlet place and re-entry place of the measuring radiation from or into the device invalidates the measured result as little as possible.

In accordance with the invention, this is achieved by a device of the above kind, which is characterized in that it has an outlet window section and an inlet window section and that the radiation source, the receiver, and the window sections are so arranged that the measuring radiation and the reference radiation emerge or enter each at the same place through the window sections but form an angle there with one another.

The device of the invention has the advantage that cleaning of the window sections must be carried out only seldom, i.e only when the measuring radiation has been weakened due to the window contamination to such an extent that, besides the other sources of error, no useful reading is furthermore obtained. Otherwise, contamination of the inlet and outlet windows does not cause trouble because the measuring and reference radiations are influenced by the changes of the window sections in the same manner and to the same degree.

The device of the invention may be employed particularly advantageously for measuring and, optionally, controlling the toner concentration in electrophotographic reproduction machines. In these cases, the decisive value represents the ratio of the intensity of the measuring radiation to the intensity of the reference radiation. With the device of the invention, however, the measuring and the reference radiations are weakened by toner deposited on the windows by the same factor (presumably an exponential function of the thickness of the contamination) so that this factor disappears upon the formation of the quotient.

The device of the invention may be of a compact and completely hermetical construction so that it principally may be incorporated into existing electrophotographic reproduction machines at a later date.

The angle formed by the measuring radiation and the reference radiation at the inlet window section or the outlet window section substantially depends on the geometrical arrangement of the windows, the light source, and the receiver. For the device for measuring the toner concentration, an angle between the two directions of radiation from about 40 to 50° at the outlet window and from about 80 to 100° at the inlet window has proved suitable. It is particularly advantageous when the perpendiculars drawn on the outlet or inlet window sections form the bisecting lines between the directions of the measuring radiation and the reference radiation. In this case, the outer sides of the outlet or inlet windows are irradiated by the measuring or reference radiation in congruent and coinciding areas and also the thickness of the irradiated disturbing layer on the outer side of the window is exactly the same. Optimum measuring and comparison conditions are obtained thereby.

The invention is further illustrated by way of the figures of the drawing.

Figure 4:
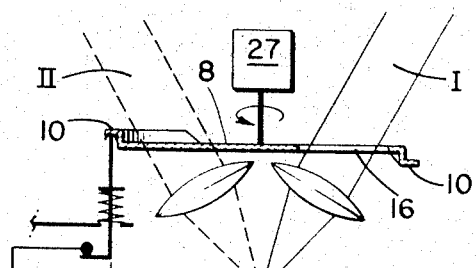
Figure 3:
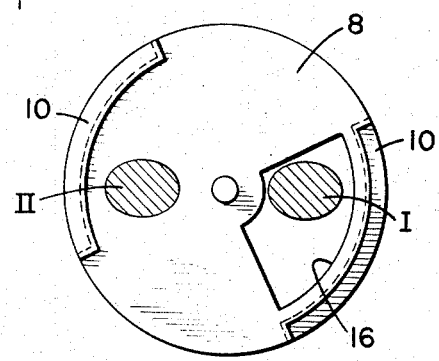
FIG. 3 is a plan view of the diaphragm shown in FIG. 2

FIG. 4 is a diagrammatic illustration of the light impulses through the opening in the diaphragm of FIG. 3.

Figure 1:
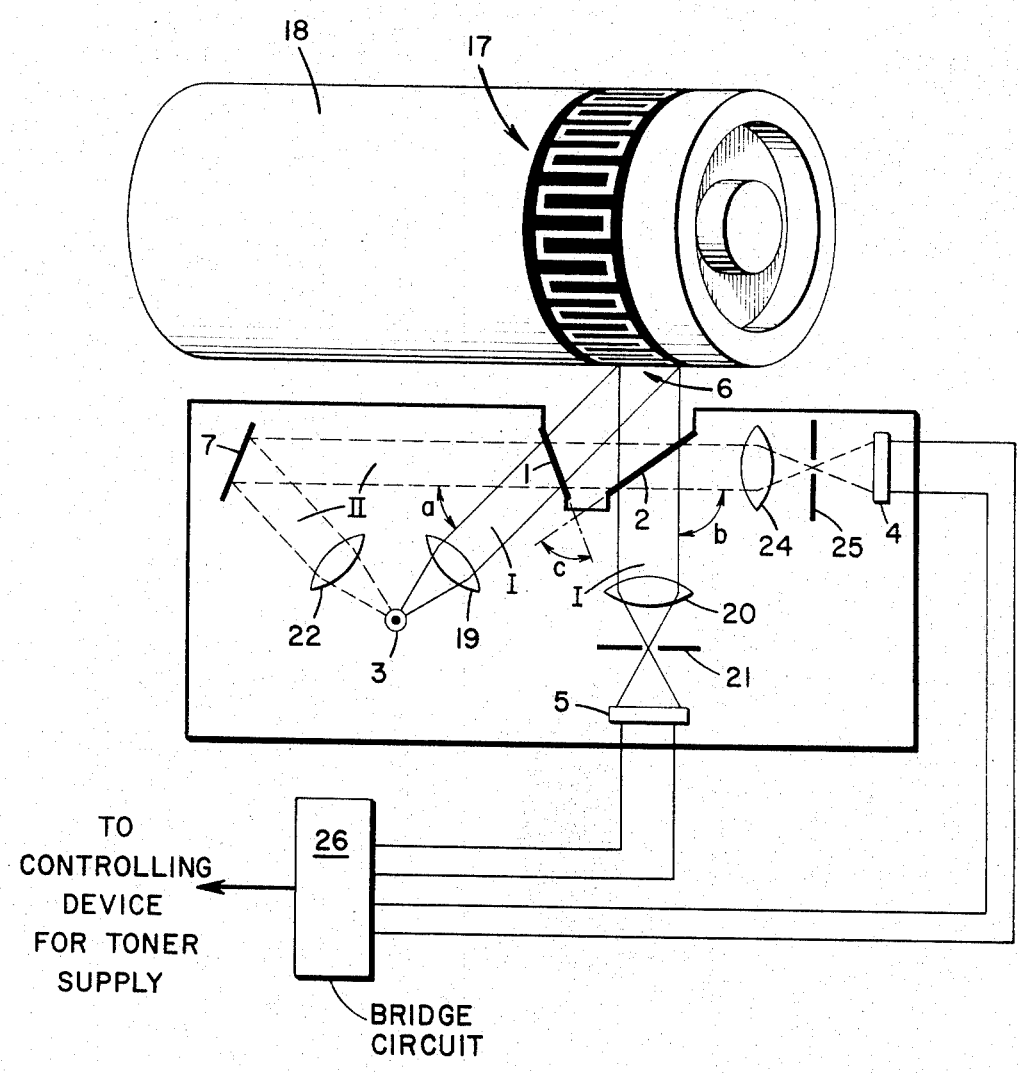
FIG. 1 is a diagrammatic view of a device of the invention for measuring the blackening of a toner test image on a photoconductor drum.

The device shown in FIG. 1 serves for measuring the blackening of a toner image 17 on a photoconductor drum 18. By means of the lens 19, the light source 3 produces a parallel measuring radiation I. This measuring radiation is scattered at the measuring place 6 and, after passing through a converging lens 20 and a diaphragm 21, is received at the receiver 5, for example a photocell.

By means of the same light source 3 and a lens 22, a reference radiation II is produced which is deflected by means of a mirror 7. The light source 3, the lenses 19 and 22, the mirror 7, and the outlet window 1 thorugh which the measuring and the reference radiations I and II leave the device are so arranged that the measuring radiation I and the reference radiation II pass exactly through the same area on the outer side of the outlet window. This is shown still more clearly in FIG. 2. Here, the outlet and inlet windows 1 and 2 are illustrated as having a somewhat exaggerated glass thickness. The measuring radiation and the reference radiation have the same configuration on the outer side of the outlet window, as has been shown by the points A1 and A2. The perpendicular 23 on the outlet window section 1 forms the bisecting line between the directions of the measuring radiation I and the reference radiation II. In this manner, not only the areas irradiated on the outer side of the outlet window but also the thickness of the disturbing toner layer irradiated by the measuring radiation and the reference radiation are the same.

The measuring radiation I impinging on the measuring place 6 is observed under an angle which may be different from the angle of incidence, as illustrated IN the drawing. The scattered radiation re-enters the device through the inlet window section 2. The measuring radiation I and the reference radiation II re-enter the device exactly at the same place through the inlet window section 2. This is shown in FIG. 2 by the points E1 and E2 at the outer side of the inlet window section 2.

As in the case of the measuring radiation, a lens 24, a diaphragm 25, and a receiver 4 are provided for the reference radiation. The measured values of the receivers 4 and 5 are compared with one another in a device 26 which principally may consist of an electronic bridge circuit. The resulting measured value may be used to automatically control the toner supply depending on the measured blackening of the measuring place 6.

Figure 2:
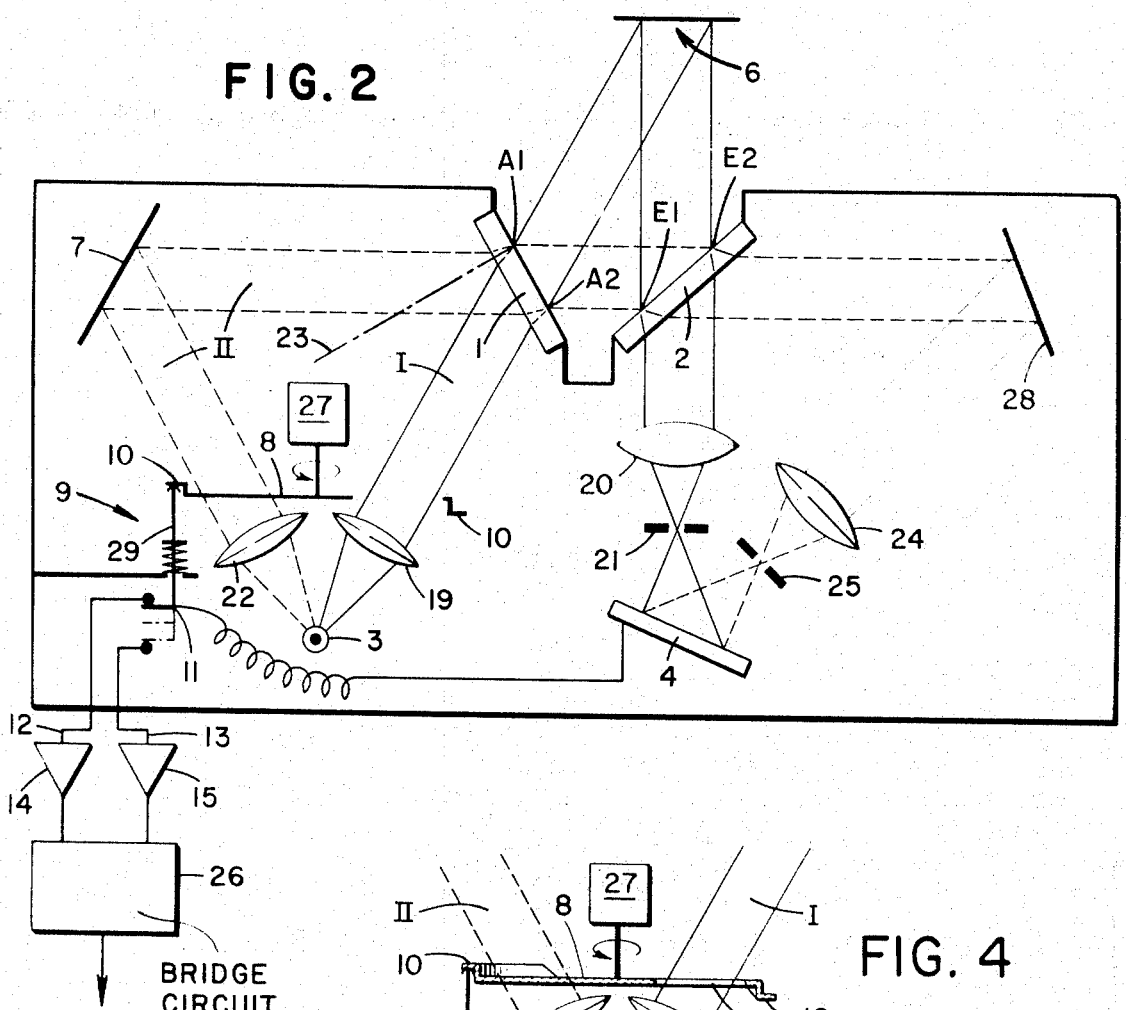
FIG. 2 is a diagrammatic view of another embodiment of the device of the invention with only one receiver.

The embodiment shown in FIG. 2 differs from that shown in FIG. 1 substantially in that only one receiver 4 is provided for the measuring and reference radiations. A diaphragm 8 rotated by a motor 27 alternately lets either the measuring radiation or the reference radiation pass through the opening 16 (FIGS. 3 and 4). In this manner, phase-displaced light impulses alternately representing the measuring or the reference radiation reach the receiver 4. A mirror 28 deflects the reference radiation to the same place of the receiver 4 as the measuring radiation.

For separation, comparison, and amplification of the alternative measuring and reference signals, there may be used an electronic lock-in amplifier.

The phase position of the diaphragm 8 is also fed for this purpose to the lock-in amplifier as an electric signal. This signal may be produced by means of protrusions 10 of the diaphragm 8, which are scanned mechanically or electrically.

Instead of the lock-in amplifier, there may also be used two individual amplifiers.

For this purpose, the diaphragm 8 of the embodiment shown in FIG. 2 has two protrusions 10, one of which projects downwardly and the other one upwardly from the diaphragm plane. By means of the switch 11, a spring-mounted rod 29 connects the outlet of the receiver 4 alternately with two different inlets 12 and 13 of two amplifiers 14 or 15, respectively. The protrusions 10 and the rod 29 are so arranged with the switch 11 that the connection between the outlet of the receiver 4 and inlet 12 of the amplifier 14 is always established when the opening 16 in the diaphragm 8 lets the measuring radiation I pass and the connection between the receiver 4 and the inlet 13 of the amplifier 15 is always established when the oepning 16 of the diaphragm 8 lets the reference radiation II pass. In this manner, the measuring signals and reference signals may be amplified separately and thereafter fed to a bridge circuit 26, for example.

The scope of the invention described with reference to the aforementioned embodiments is intended to be limited only by the scope of the hereafter appended claims.

What is claimed is:

1. Apparatus for producing a measuring or control signal, comprising: signal source means for producing a measuring signal and a reference signal; an outlet window through which said measuring and reference signals emerge, said outlet window being so arranged that said measuring and reference signals emerge from said outlet window at the same place and at an angle with respect to one another; an inlet window through which said measuring and reference signals enter, said inlet window being so arranged that said measuring and reference signals enter said inlet window at the same place and at an angle with respect to one another; and means for converting said measuring and reference signals to obtain a signal representative of the quantity measured by said measuring signal.

2. Apparatus according to claim 1, characterized wherein said inlet and outlet windows are arranged in an angle opened in the direction of the measuring place.

3. Apparatus according to claim 1, characterized in that the perpendicular drawn on the outlet window or the perpendicular drawn on the inlet window respectively form the bisecting lines between the direction of the measuring signal and the direction of the reference signal.

4. Apparatus according to claim 1, wherein said signal source means comprises a light source.

5. Apparatus according to claim 1, wherein only one radiation source is provided for the measuring and the reference signals.

6. Apparatus according to claim 5, characterized in that a mirror deflecting device is provided for the reference signal.

7. Apparatus according to claim 1, wherein said signal source means comprises means for producing pulsed measuring and reference signals phase shifted with respect to each other; and said converting means comprises a single receiver for receiving said measuring and reference signals and means for phase shifting the output of said single receiver to separate said measuring and reference signals.

8. Apparatus according to claim 7, further comprising a rotating diaphragm which passes the measuring signal only when the reference signal is completely stopped and which passes the reference signal only when the measuring signal is completely stopped.

9. Apparatus according to claim 8, wherein said diaphragm has elements which cooperate with a switch to connect the outlet of the receiver alternately with the inlets of separate amplifiers, the elements being so constructed and arranged that the connection to the measuring signal amplifier is established only when the diaphragm stops the reference signal and passes the measuring signal and the connection to the reference signal amplifier is established only when the diaphragm stops the measuring signal and passes the reference signal.

10. Apparatus according to claim 8, further comprising a lock-in amplifier which amplifies and separates the measuring signals and control signals.

* * * * *